United States Patent [19]

Anson

[11] Patent Number: 5,211,103
[45] Date of Patent: May 18, 1993

[54] CONVERTIBLE BREWER
[75] Inventor: James H. Anson, Auburn, Ill.
[73] Assignee: Bunn-O-Matic Corporation, Springfield, Ill.
[21] Appl. No.: 906,034
[22] Filed: Jun. 26, 1992

Related U.S. Application Data

[63] Continuation of Ser. No. 673,683, Mar. 22, 1991, abandoned.

[51] Int. Cl.⁵ .............................................. A47J 31/44
[52] U.S. Cl. ........................................ 99/284; 99/295; 200/296
[58] Field of Search ............... 99/279, 284, 290, 295, 99/304, 306, 312, 316; 426/433; 220/3.; 174/53, 66; 200/293, 296, 297; 361/346, 347, 350, 351, 358, 359, 390; 248/27.1, 27.3

[56]  References Cited

U.S. PATENT DOCUMENTS

| 1,400,155 | 12/1921 | Greenburg | 248/27.3 X |
|---|---|---|---|
| 3,122,987 | 3/1964 | Ruhnke | 99/290 |
| 3,218,955 | 11/1965 | Lorang | 99/282 |
| 3,793,935 | 2/1974 | Martin | 99/295 |
| 4,054,085 | 10/1977 | Tarr | 99/284 |
| 4,227,238 | 10/1980 | Saito | 200/296 X |
| 4,280,401 | 7/1981 | Cleland | 99/295 |
| 4,398,073 | 8/1983 | Botz et al. | 248/27.3 X |
| 4,621,571 | 11/1986 | Roberts | 99/285 X |
| 4,829,888 | 5/1989 | Webster et al. | 99/284 |
| 4,867,048 | 9/1989 | Brewer | 99/295 X |
| 4,892,031 | 1/1990 | Webster et al. | 99/284 |

OTHER PUBLICATIONS

"The Mark of Quality in Beverage Equipment—BUNN-O-MATIC COFFEE BREWERS", product sheet, p. 2, copyright 1989.
"Low Profile-BUNN Convertible Coffee Brewers for Maximum Versatility", product sheet, pp. 1 and 2, copyright 1990.
"NEW BUNN-O-MATIC-Model RL35S Side or Front Loading Coffee Brewer", pp. 1 and 2, date unknown.

Primary Examiner—Harvey C. Hornsby
Assistant Examiner—Charles Cooley
Attorney, Agent, or Firm—Trexler, Bushnell, Giangiorgi & Blackstone, Ltd.

[57]  ABSTRACT

A reconfigurable beverage brewing apparatus having an independently configurable funnel support device and control device for orienting the apparatus in more than two operational configurations. The apparatus includes an overhanging hood and a funnel supported under the hood for retaining brewing substance. A discharge tube is retained in the hood proximate to the funnel and extends through the hood portion for delivering heated water to the brewing substance retained therein. The funnel support device includes a base with two channel members attached thereto and anchoring devices. Open ends of each of the channel members are positioned opposite each other and spaced apart a distance for receiving and retaining the funnel. The discharge tube projects through a passage formed through the base. The anchoring devices attach the base to an underside of the hood and prohibit rotation of the base portion. The control devices include a panel portion with multiple openings formed therethrough which is removably attachable to the apparatus; control devices which are engageable in the slots formed through said apparatus; and device positioning members for removably retaining the control devices in a desired position behind the panel.

14 Claims, 3 Drawing Sheets

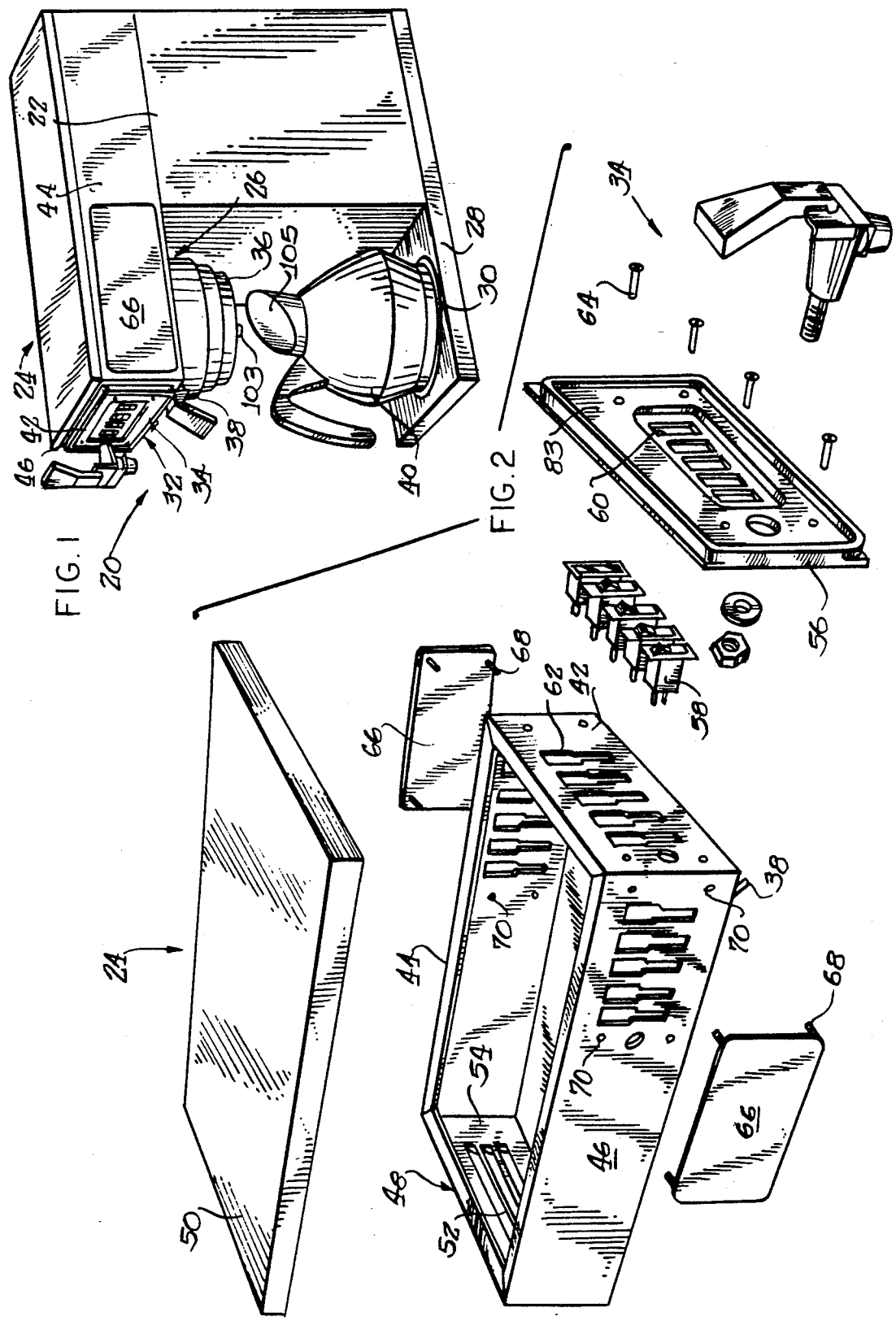

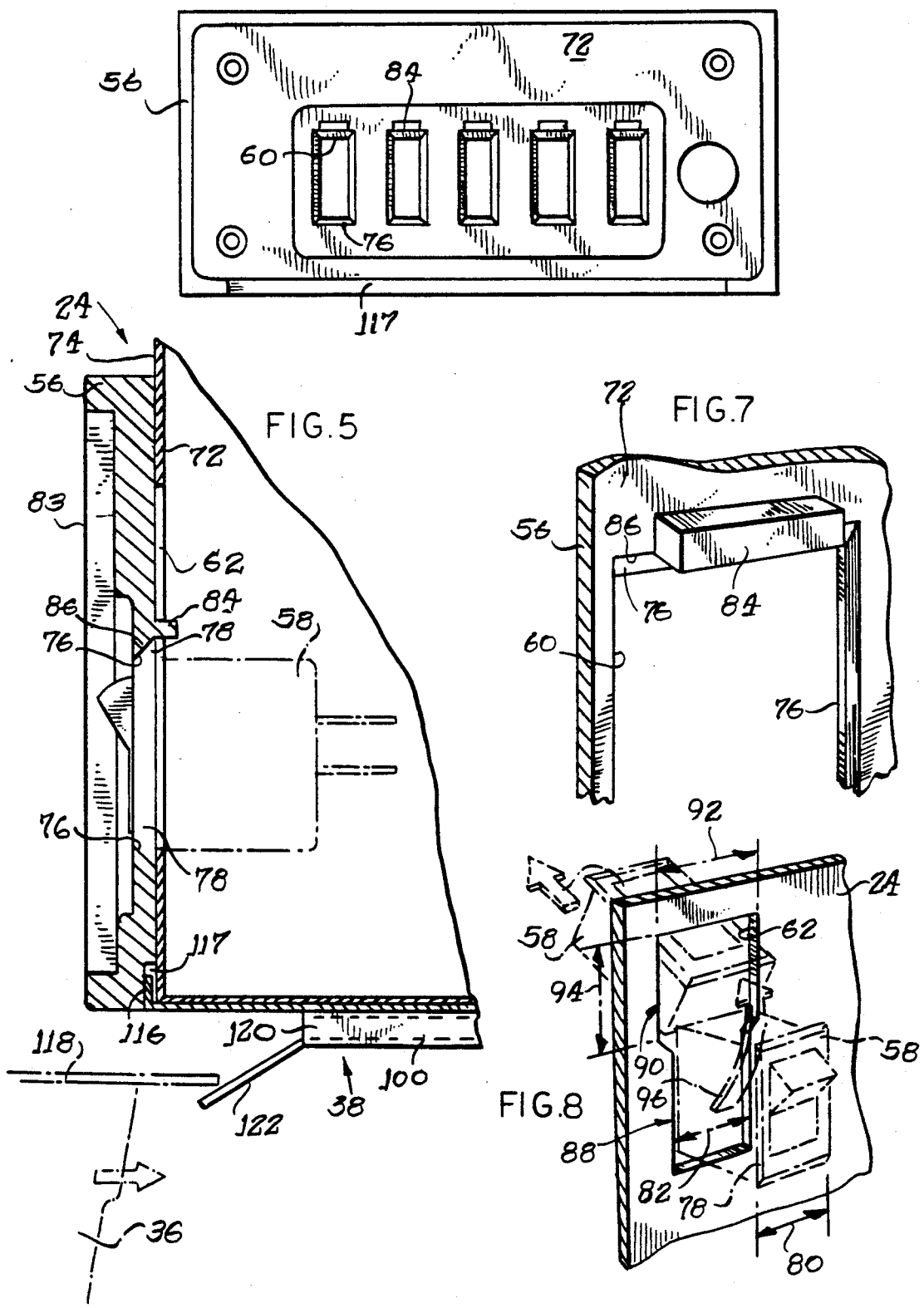

CONVERTIBLE BREWER

This application is a continuation of application Ser. No. 07/673,683, filed Mar. 22, 1991, now abandoned.

BACKGROUND OF THE INVENTION

This invention relates to a beverage brewing apparatus with a reconfigurable control assembly permitting the apparatus to be used in any of several orientations.

Many forms of beverage brewing apparatus are in common use in commercial as well as consumer settings. One type of beverage brewing apparatus is a siphon type having a generally "C" shaped body. A heating pad is positioned below an overhanging portion which supports a brewer basket for holding a brewing substance therein. A spray head is positioned above the brewer basket and feeds heated water into the basket to infuse the brewing substance for producing a brewed beverage. A decanter is placed on the heating pad below the brewer funnel for catching the brewed beverage which flows therefrom.

In manufacturing beverage brewing apparatus it is desirable to minimize the number of different parts among various models so a to minimize parts inventories, parts accounting, parts production costs, and especially to simplify field repair, repair training, and machine complexity. Because of the wide spread use of such beverage brewing apparatus, it is desirable to provide an apparatus which can accommodate a variety of space limitations. For example, if a brewer is purchased by a restaurant and the brewer must be relocated, it would be beneficial for the owner to be able to move the brewer to a new location with little regard for the space limitations of the new location.

It also would be desirable for a manufacturer of such apparatus to produce only one machine instead of several discrete machines to accommodate a variety of settings. For example, in some settings the surface on which the brewer is located, a counter top for instance, may vary in dimension. Some counter tops may be narrow, others may be wider. One setting may require control of the apparatus and loading of the brewer basket from the front of the machine while another may require control and basket loading from the left or right side of the machine. However, if the location of the controls and the support for the brewer basket on the device are fixed, the device may be prohibited from use in one setting or the other. Therefore, it would be desirable to provide a brewing apparatus which can be configured for use on a wide counter and reconfigured for use on a narrow counter.

U.S. Pat. No. 4,829,888 to Webster et al. shows a beverage brewer which appears to permit a control panel to be placed in one of three locations and permits funnel supporting rails to be likewise positioned. However, the device shown in Webster et al. has several limitations.

First, the device requires that an enlarged opening be formed through the housing to accommodate the movable switch panel. Such a large opening compromises the structural integrity of the brewer apparatus. Second, the switches are mounted directly to the panel. This arrangement disturbs all of the devices attached to the panel when only one of the devices, such as a switch or an indicator light may need replacement. Third, the two rails supporting the brewer basket beneath the spray head are independent pieces and require numerous pieces of hardware for attachment to the brewer. These shortcomings result in increased service time when servicing the device in the field and increased parts inventories and accounting. Therefore, it appears that the device to Webster et al. does not overcome all of the problems or satisfy all of the requirements of the users of such a device.

OBJECTS AND SUMMARY OF THE INVENTION

A general object of the present invention is to provide a single beverage brewing apparatus which can be configured for use in one of several orientations.

Another object of the present invention is to provide a beverage brewing apparatus which has a control assembly which may be quickly and easily moved to an alternate orientation without disconnecting any of the control devices.

Yet another object of the present invention is to provide a beverage brewing apparatus which has a brewer funnel support which can be quickly and easily moved to an alternate orientation independent from the control assembly.

Briefly, and in accordance with the foregoing, the present invention comprises a beverage brewing apparatus which can be configured for use in one of several orientations and is quickly and easily reconfigured in the field. The beverage brewing apparatus has a control assembly and a brewer funnel support which may be independently configured in one of several orientations without disconnecting any control devices.

BRIEF DESCRIPTION OF THE DRAWINGS

The organization and manner of the operation of the disclosed embodiment of the invention, together with the further objects and advantages thereof, may be understood best by reference to the following description taken in connection with the accompanying drawings wherein like reference numerals identify like elements in which:

FIG. 1 is a perspective view of a beverage brewing apparatus of the present invention;

FIG. 2 is an exploded perspective view of a hood portion of the beverage brewing apparatus rotated 90 counter-clockwise relative to the orientation as shown in FIG. 1.;

FIG. 5 is an enlarged cross-sectional view of the hood portion of the present invention taken along line 5-5 in FIG. 4;

FIG. 6 is a plan view of a rear face of the control panel of the present invention;

FIG. 7 is an enlarged partial sectional perspective view of a device opening formed through the panel portion as shown in FIG. 6: and FIG. 8 is an enlarged partial sectional perspective view of a device slot as shown in FIG. 4 as viewed from a front face in which a control device is shown (in phantom line) being removed from the device slot.

DETAILED DESCRIPTION OF THE ILLUSTRATED EMBODIMENT

Figure 3:
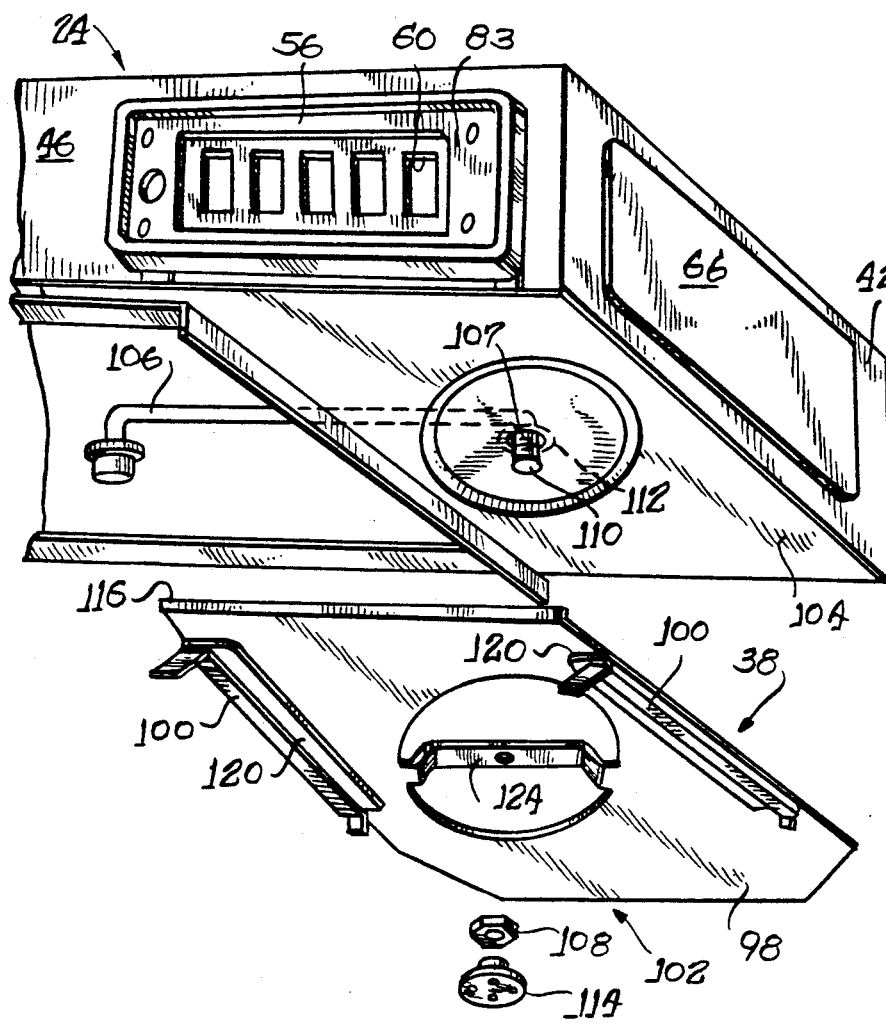
FIG. 3 is an exploded partial fragmentary view of a hood portion of the beverage brewing apparatus as viewed from below in which a control panel and funnel support are positioned for access from a left side of the hood portion relative to the device as shown in FIGS. 1 and 2.

While this invention may be susceptible to embodiment in different forms, there is shown in the drawings and will be described herein, a preferred embodiment of the present invention with the understanding that the present disclosure is to be considered an exemplification of the principals of the invention, and is not intended to limit the invention to the embodiment illustrated and described herein.

Referring now to the drawings, wherein like parts are designated by the same reference numerals throughout the figures, a beverage brewing apparatus 20 is shown in FIG. 1. The beverage brewing apparatus 20 as shown in FIG. 1 has a body portion 22 having a generally vertical orientation with a hood portion 24 attached thereto and extending away from the body 22 forming an overhanging portion 26. A base 28 including a warming pad 30 is positioned below the overhanging portion 26. Control means 32 are generally retained in the hood portion 24. Control mounting means 34 are attached to a face of the overhanging portion 26 of the hood portion 24 providing convenient access thereto. A brewer funnel 36 is retained underneath the overhanging portion 26 by funnel supporting means 38 (as better shown in FIG. 3). A decanter 40 is positioned below the funnel 36 on the warming pad 30 for receiving a brewed beverage flowing from the funnel 36.

The beverage brewing apparatus 20 as illustrated in FIG. 1, has three operational configurations. As shown in FIG. 1, the beverage brewing apparatus 20 is configured with the funnel supporting means 38 and control mounting means 34 positioned for access from a front side face 42 of the apparatus 20. As will be described herein in further detail, the funnel supporting means 38 and the control mounting means 34 are easily repositionable to provide operational access to the funnel 36 and control of the apparatus from a right side face 44 or a left side face 46 (see FIG. 2). The ability to quickly and easily reconfigure the apparatus 20 permits a single beverage brewing apparatus 20 to be reconfigured for a variety of operational configurations.

Turning now to FIG. 2, the hood portion 24 of the beverage brewing apparatus 20 is exploded in order to describe the control mounting means 34 in further detail. The hood portion 24 includes a hood casing 48 providing a generally box-like structure containing the control means 32 (not shown) and to which is attached the control mounting means 34. A top 50 covers the hood casing 48 and vents 52 are formed through a back face 54 to permit air flow therethrough. The control mounting means 34 include a panel portion 56 positionable in front of multiple control devices 58 which project or are accessible through device openings 60 formed through the panel portion 56.

The control mounting means 34 further includes device slots 62 formed through each face 42, 44, 46 of the hood casing 48. The control devices 58 are retained in the device slots 62 and accessibly covered by the panel portion 56 which is attached to the hood casing 48 by fastener means 64. The device slots 62 on the unused faces (as shown in FIG. 2, right side face 44 and left side face 46) are covered by cover panels 66 which are mounted to the hood casing 48 by mounting studs 68 attached thereto and engageable with mounting holes 70. While the fastener means 64 and the mounting studs 68 are shown as threaded fastener devices other means of attaching the panel portion 56 and the cover panel 66 may be employed.

Figure 4:
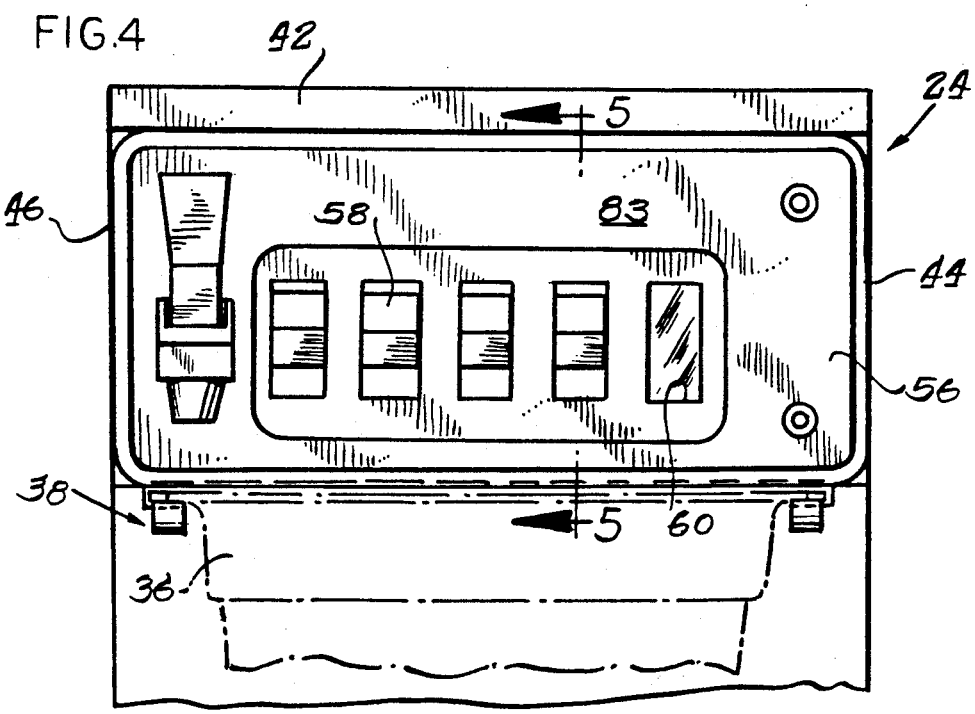
FIG. 4 is an enlarged partial fragmentary front elevation of the hood portion of the beverage brewing apparatus.

FIG. 4 is an enlarged partial front elevation of the hood portion 24 of the present invention. As shown in FIG. 4, the panel portion 56 is attached to the front face 42 of the hood portion 24 and retains the control devices 58 in an organized configuration. The control devices 58 include switches as well as indicator lights (see far right side control device) as well as any other control device which may be required for operation of the beverage brewing apparatus 20. The device openings 60 formed through the panel portion 56 are formed having a sufficient dimension for retaining a control device 58 in engagement with a corresponding device slot 62 (not shown in FIG. 4).

FIG. 5 is an enlarged partial cross-sectional view taken along line 5—5 in FIG. 4 through the panel portion 56 and a control device 58. As shown in FIG. 5, with further reference to FIGS. 6, 7 and 8, an interior surface 72 of the panel portion 56 abuts an exterior surface 74 of the hood portion 24 to which the panel portion 56 is mounted. Mounting of the panel portion 56 to the hood portion 24 retains the control device positioned in the device slot 62 in a relative horizontal stationary position.

FIG. 6 provides a view of the interior surface 72 of the panel portion 56 showing recesses 76 which are formed projecting into the interior surface 72 of the panel portion 56. The recesses 76 cooperatively engage device flanges 78 formed around the perimeter of the control device 58. As shown in FIG. 8, a flange dimension 80 is slightly larger than a retention dimension 82 of the device slot 62. The flange 78 prevents the control device 58 from being forced through the device slot 62 into the hood portion 24. Engagement of the retaining flange 78 in the recesses 76 promote uniform alignment of the switches 58 as viewed from a front side 83 of the panel portion 56.

A vertical restraining protrusion 84 is formed on the interior surface 72 of the panel portion 56 for preventing vertical movement of the control device 58 in the device slot 62. Since the device slot 62 is elongated (as will be discussed further hereinbelow), the vertical restraining protrusion 84 prohibits vertical movement of the control device 58 in the device slot 62. As shown in greater detail in the enlarged partial fragmentary view of FIG. 7, the protrusion 84 is generally mounted above each device opening 60 on an upper edge 86 of the corresponding recess 76.

An enlarged view of a device slot 62 formed through one of the faces 42, 44, 46 of the hood portion 24 is shown in FIG. 8. The slot 62 as shown in FIG. 8 includes a device retaining portion 88 and a device removal portion 90. The device retaining portion 88 has a smaller width dimension or retaining dimension 82 than the width dimension 92 of the removal portion 90. As noted above, the retaining dimension 82 is at least slightly smaller than a width dimension 80 measured across the device flange 78 for retaining the control device 58 therein. The width dimension 92 is at least slightly larger than the width dimension 80 across the outside of the flange 78 to permit the control device 58 to pass therethrough. The device removal portion 90 further has a removal dimension 94 which is of sufficient dimension to permit the control device 58 to be moved (as indicated by arrow 96) therethrough for removal of the control device 58 into the hood portion 24.

Because the control devices 58 are not attached to the panel portion 56, they can be easily removed from and replaced or positioned through another face of the hood portion 24 without disconnecting the wiring connecting them to the control means 32 (control means and wiring connecting the control devices 58 are not shown). The ability to reconfigure the control devices 58 further reduces operating problems due to improperly connected control devices 58 after they have been repositioned to another face of the hood portion 24. The recesses 76 and the vertical restraining protrusions 84 eliminate the need for discretely mounting each of the control devices 58 to the corresponding face of the hood portion 24 thereby reducing the number of parts required and the operations needed to mount the control devices 58 in the device slots 62. It should be noted, that the panel portion 56 is dimensioned to retainably cover the control device 58 in the retaining portion 88 of the device slot 62 as well as cover the device removal portion 90 of the device slot 62 to prevent foreign matter from accumulating in the hood portion 24.

Referring now to FIGS. 3, 4 and 5, the funnel support means 38 will be described in further detail. As shown in FIG. 3, the funnel support means 38 includes a base member 98 having two channel members or rails 100 attached thereto and anchoring means 102 for attaching the funnel support means 38 to an underside 104 of the hood portion 24. With reference to FIG. 1, the funnel support means 38 supports the brewer funnel 36 which retains a brewing substance therein for dispensing a brewed beverage into the decanter 40. The funnel 36 is supported below the hood portion 24 for placing an open nipple 103 on the bottom of the funnel 36 in a position above the mouth 105 of the decanter 40. Heated water is delivered to the funnel 36 through a discharge tube 106 which projects through an aperture 107 formed through the underside 104 of the hood portion 24 (as shown in FIG. 3).

The anchoring means 102 includes a locking nut 108 which threadedly engages a threaded portion 110 of the discharge tube 106 extending through the underside 104 of the hood portion 24. A flange portion 112 is attached to the discharge tube 106 on the inside of the underside 104 to prevent the discharge tube 106 from being undesirably displaced through the aperture 107. A spray head 114 is attached to the threaded portion 110 of the discharge tube 106 to deliver heated water to the funnel 36 positioned thereunder. Rotation resisting means 116 prevents the base member 98 from undesirably rotating when the funnel 36 is repeatedly attached and removed therefrom. As shown in FIG. 3, the rotation resisting means includes the front flange or lip member 116 which also promotes smooth engagement of the funnel 36 with the rails 100.

A groove 117 extends along and parallel to a bottom inside edge of the panel 56. The groove 117 is sized and dimensioned to receive and conceal the lip 116 therebehind. Reorientation of the funnel support means 38 requires unscrewing the sprayhead 114 from the threaded portion 110 of the discharge tube sufficiently to disengage the lip 116 from the groove 117 and permit the funnel support means 38 to be rotated about the threaded portion 110 to a desired orientation. Alternatively, the sprayhead 114 could be completely unscrewed from the threaded portion 110 thereby permitting the funnel support means 38 to be removed completely therefrom and rotated to a desired orientation. Once the support means 38 is in a desired orientation, it may be reassembled over the threaded portion 110 of the discharge tube whereupon the sprayhead 114 may be screwed back onto the threaded portion 110 to retain the funnel support means 38 in the newly selected orientation.

As shown in FIG. 5, the top perimeter of the funnel 36 has a flange 118 formed there around for engaging the rails 100. The rails 100 are positioned with open ends 120 of each facing each other for engaging the flange 118 formed on the funnel 36. Engaging ramps 122 formed on a leading edge of the funnel support means 38 help to guide the flange 118 into engagement with the open ends 120 of the rails 100.

In use, the present invention permits positioning of the beverage brewing apparatus 20 in numerous operational configurations using the same control means, control mounting means 34 and funnel support means 38. The apparatus 20 has a right 44, front 42, and left side face 46 which may be oriented for use of the apparatus 20 from any of these positions. The control mounting means 34 and funnel support means 38 may be positioned on any of the three faces 42, 44, 46 for use of the apparatus 20 therefrom. For example, if the area in which the apparatus 20 will be used requires it to be oriented with the front face 42 facing outwardly, the control mounting means 34 and funnel supporting means 38 may be configured for control and access from the front face 42.

Control and access from the front face 42 would require orienting the control mounting means 34 on the front face 42 and attaching the funnel supporting means 38 so that the engaging ramps 22 on the leading edge of the rails 100 are positioned below the panel portion 56 on the front face 42.

The hood portion 24 is formed with a set of device slots 62 formed on each of the faces 42, 44, 46 for easy reconfiguration of the device in the field. Each device slot 62 is formed with a device retaining portion 88 and a device removal portion 90 which provides secure retention of the control devices 58 therein and easy removal of the control device 58 into the head portion 24. Removal of the control device 58 into the head portion 24 eliminates the need to disconnect each and every control device 58 upon reconfiguring the apparatus 20 for use in a different operational configuration. Once the control devices 58 are positioned in the desired group of device slots 62, the panel portion 56 is attached thereto to securely retain the control devices 58 in the desired position. Flanges 78 formed around the perimeter of the control devices 58 engage the recesses 76 formed on the interior surface 72 of the panel portion 56. Vertical restraining protrusions 84 prohibit upward vertical movement of the control device 58. The recesses 76 and restraining protrusions 84 securely retain the control device 58 in a desired position in the retaining portion 88 of the slot 62. Groups of device slots 62 not in use are covered by cover panels 66 which engage the mounting holes 70 located in positions on the respective face, and to the cover panels 66 as well as the panel portion 56.

The funnel support means 38 may be oriented to correspond to the operational configuration of the control mounting means 34. Attachment of the funnel support means 38 to the hood portion 24 is accomplished by engaging a threaded end 110 of the discharge tube 106 through a hole 124 formed through the base member 98 and threadedly engaging a locking nut 108 thereon. A spray head 114 is attached over the threaded end 110 to deliver heated water from the discharge tube 106 to the funnel 36 positioned therebelow. Rails 100 attached to the base member 98 are oriented to engage the flange 118 formed on the funnel 36 in the same orientation as the control devices 58 are accessed from the panel portion 56.

While a preferred embodiment of the present invention is shown and described, it is envisioned that those skilled in the art may devise modifications of the present invention without departing from the spirit and scope of the appended claims.

The invention is claimed as follows:

1. A reconfigurable beverage brewing apparatus having independently configurable funnel support means and control mounting means for orienting said apparatus in a plurality of operational configurations; said apparatus including an overhanging hood portion with said funnel support means attached thereto for supporting a funnel under the hood portion for retaining a brewing substance therein, a discharge portion in said hood portion proximate to said funnel for delivering heated water to said funnel; said funnel support means comprising an independently removable base member, two channel members attached to said base member, a laterally extending gap along one edge of each of said channel members, and anchoring means for attaching said funnel support means underneath said hood portion, said laterally extending gap of each of said channel members being positioned opposing each other and spaced apart a distance for receiving and retaining a funnel therebetween; said control mounting means including a panel portion removably overlying a surface of said apparatus, said panel portion having multiple openings therethrough, said apparatus having individual slots extending through a side wall of the apparatus for receiving and retaining removable control devices, said openings in said panel portion cooperatively aligning with and overlying said removable control devices which are retained in said slots, said removable control devices being accessible through said openings, and device retaining means attached to a surface of said panel portion abutting said control devices proximate to said openings for removably retaining said control devices in a desired position behind said panel portion when said panel portion is attached to said apparatus.

2. A reconfigurable beverage brewing apparatus according to claim 1 in which said device retaining means includes flange portions attached around a perimeter of said devices, said individual device slots being formed through said hood portion for retaining said devices therein, said panel portion including recesses projecting into a surface of said panel portion abutting the hood portion for cooperatively receiving said device flanges therein, said flange portions cooperatively mating in said recesses and being retained between said recesses in said panel portion and a surface of said apparatus surrounding said slots; an inside dimension of said individual slots being substantially on the order of an inside dimension of said flange portions and an outside dimension of said flange portions being at least slightly greater than said inside dimension of a corresponding one of said individual slots.

3. A reconfigurable beverage brewing apparatus according to claim 1 wherein said anchoring means further includes a lip member, said lip member being attached to said base member, said lip member projecting upwardly away from said base and abutting an outside surface of said hood portion for prohibiting rotation of said funnel support means positioned under said hood member when said funnel is repeatedly engaged with and disengaged from said funnel support means.

4. A reconfigurable beverage brewing apparatus according to claim 1 wherein said anchoring means further includes a threaded portion of said discharge portion extending through said base member and a single locking nut member engageable with said threaded portion for retaining said funnel support means under said hood member proximate to said discharge portion.

5. A reconfigurable beverage brewing apparatus having independently configurable funnel support means and control mounting means for orienting said apparatus in a plurality of operational configurations; said apparatus including an overhanging hood portion, a discharge tube, and an open ended funnel for retaining a beverage brewing substance, said discharge tube extending through said hood portion and communicating with said funnel for delivering heated water to said brewing substance disposed therein, a mounting flange attached generally around a top portion of said funnel for releasably engaging said funnel support means; said funnel support means comprising a base member having two elongated channel members attached thereto, a laterally extending gap along one edge of each of said channel members, and anchoring means for attaching said funnel support means to a downwardly facing surface of said hood portion, said laterally extending gap on each of said channel members being oppositely positioned and spaced apart a distance for receiving said mounting flange therebetween, a hole formed through said base member for receiving said discharge tube therethrough, said anchoring means threadedly engaging said discharge tube for removably attaching said base member to said downwardly facing surface of said hood portion with said discharge tube projecting therethrough proximate to said funnel retained on said base member for delivering heated water to said brewing substance disposed in said funnel; said control mounting means comprising a removable panel portion being removably attachable to any of a plurality of faces of said apparatus, removable control devices positionable in individual slots formed through said faces of said apparatus, and said panel portion overlying said control devices positioned in said slots for removably retaining said control devices in selected individual slots in a desired position between said panel portion and an abutting surface of said face of said apparatus.

6. A reconfigurable beverage brewing apparatus according to claim 5 wherein said anchoring means includes rotation resisting means for prohibiting rotational movement of said base member about said discharge tube when said funnel is inserted and removed from said elongated channel members.

7. A reconfigurable beverage brewing apparatus according to claim 5 wherein said rotation resisting means includes a lip member being attached to and extending upwardly from said base member, said lip member abutting an outside surface of said hood portion.

8. A reconfigurable beverage brewing apparatus having reconfigurable control means for permitting orientation of said apparatus in more than one operational configuration; a body of said apparatus having multiple faces, each of said faces generally corresponding to a configuration in which said apparatus is operable, multiple individual device slots formed through each of said faces; said control means comprising removable control devices removably positioned on said body extending through a corresponding one of said individual device slots, and device retaining means including a panel portion removably attached to one of said faces of said apparatus, said panel portion having openings therethrough positioned to cooperatively coincide with said device slots and overlying a portion of said control devices positioned in said slots for removably retaining said control devices in a desired position with a portion of said control device being retained between said panel portion and said body of said apparatus.

9. A reconfigurable beverage brewing apparatus according to claim 8 in which said device retaining means comprises flange portions attached around a perimeter of said control devices, said individual device slots being formed through said hood portion for retaining said control devices therein, said panel portion including recesses projecting into a surface of the panel portion abutting an outside surface of said hood portion for cooperatively receiving said flange portions therein, said flange portions cooperatively mating in said recesses and against an outside surface of said hood portion; an inside dimension of said device slots being substantially on the order of an inside dimension of said flange portions and an outside dimension of said flange portions being at least slightly greater than said inside dimension of a corresponding one of said device slots.

10. A reconfigurable beverage brewing apparatus having independently configurable funnel support means and control mounting means for orienting said apparatus in a plurality of operational configurations; said apparatus including an overhanging hood portion and funnel support means for supporting a funnel under the hood portion for retaining a brewing substance therein, a discharge portion in said hood portion proximate to said funnel for delivering heated water to said funnel; said funnel support means comprising a base member, two channel members attached to said base member, a laterally extending gap along one edge of each of said channel members, and anchoring means for attaching said funnel support means underneath said hood portion, said laterally extending gap of each of said channel members being positioned opposing each other and spaced apart a distance for receiving and retaining a funnel therebetween; said control mounting means including a panel portion removably overlying a surface of said apparatus, said panel portion having multiple openings therethrough, said apparatus having individual slots extending through a side wall of the apparatus for receiving and retaining removable control devices, said openings in said panel portion cooperatively aligning with and overlying removable control devices which are retained in said slots, said removable control devices being accessible through said openings, and device retaining means attached to a surface of said panel portion abutting said control devices proximate to said openings for removably retaining said control devices in a desired position behind said panel portion when said panel portion is attached to said apparatus; said device retaining means include flange portions attached around a perimeter of said control devices, said individual device slots being formed through said hood portion for retaining said control devices therein, said panel portion including recesses projecting into a surface of said panel portion abutting the hood portion for cooperatively receiving said flange portions therein; an inside dimension of said individual slots being substantially on the order of an inside dimension of said flange portions and an outside dimension of said flange portions being at least slightly greater than said inside dimension of a corresponding one of said individual slots; said slots further including a removal portion and a retaining portion, said removal portion communicating with said retaining portion, a retaining dimension of said retaining portion being substantially on the order of said inside dimension of said flange portions, a width dimension of said removal portion being slightly greater than said outside dimension of said flange portions, and a removal dimension of said removal portion being sized for permitting removal of said device from said retaining portion and into said hood portion.

11. A reconfigurable beverage brewing apparatus reconfigurable control means for permitting orientation of said apparatus in more than one operational configuration; a body of said apparatus having multiple faces, each of said faces generally corresponding to a configuration in which said apparatus is operable, multiple individual device slots formed through each of said faces; said control means comprising removable control devices removably retained on said body in a corresponding one of said individual device slots, and device retaining means for removably retaining said control devices in a desired position in said slots; said device retaining means comprises a panel portion removably attached to one of said faces of said apparatus, said panel portion having openings therethrough proximate to said device slots, flange portions around a perimeter of said control devices, said individual device slots being formed through said hood portion for receiving said control devices therein, said panel portion including recesses projecting into a surface of the panel portion abutting an outside surface of said body for cooperatively receiving said flange portions therein, said flanges cooperatively mating in said recesses and against an outside surface of said body; an inside dimension of said device slots being substantially on the order of an inside dimension of said flange portions and an outside dimension of said flange portions being at least slightly greater than said inside dimension of a corresponding one of said device slots, inwardly projecting protrusions attached to said rearside of said panel along a top edge of each of said openings for retaining said control devices in a desired position when positioned in said individual device slots, each of said protrusions abuttably engaging a corresponding one of said control devices positioned in a respective one of said individual device slots for prohibiting vertical movement of said control device being retained in said individual device slot; said device slots formed through said body further include a removal portion and a retaining portion, said removal portion communicating with said retaining portion, a retaining dimension of said retaining portion being substantially on the order of said inside dimension of said flange portions, a width dimension of said removal portion being slightly greater than said outside dimension of said flange portions, and a removal dimension of said removal portion being sufficient for permitting removal of said control device from said retaining portion and into said body.

12. A reconfigurable beverage brewing apparatus having independently configurable funnel support means and control mounting means for orienting said apparatus in a plurality of operational configurations; said apparatus including an overhanging hood portion and funnel support means for supporting a funnel under the hood portion for retaining a brewing substance therein, a discharge portion in said hood portion proximate to said funnel for delivering heated water to said funnel; said funnel support means comprising an independently removable base member, two channel members attached to said base member, a laterally extending gap along one edge of each of said channel members, and anchoring means for attaching said funnel support means underneath said hood portion, said laterally extending gap of each of said channel members being positioned opposing each other and spaced apart a distance for receiving and retaining a funnel therebetween; said control mounting means including a panel portion removably overlying a surface of said apparatus, said panel portion having multiple openings therethrough, said apparatus having individual slots extending through a side wall of the apparatus for receiving and retaining removable control devices, said openings in said panel portion cooperatively aligning with and overlying said removable control devices which are retained in said individual slots, said removable control devices being accessible through said openings, and device retaining means attached to a surface of said panel portion abutting said control devices proximate to said openings for removably retaining said control devices in a desired position behind said panel portion when said panel portion is attached to said apparatus; said device retaining means including flange portions around a perimeter of said devices, said individual slots being formed through said hood portion for retaining said devices therein, said panel portion including recesses projecting into an interior surface of said panel portion for cooperatively receiving said flange portions therein; an inside dimension of said individual slots being substantially on the order of an inside dimension of said flange portions and an outside dimension of said flange portions being at least slightly greater than said inside dimension of a corresponding one of said individual slots, said device retaining means further including inwardly projecting protrusions associated with an interior surface of said panel and insertable into a portion of said individual slots for retaining said devices in a desired position, each of said protrusions extending from a top edge of each of said openings formed through said panel portion and engaging a corresponding one of said devices positioned in a respective one of said individual slots for prohibiting vertical movement of said device being retained in said individual slot.

13. A reconfigurable beverage brewing apparatus having independently configurable funnel support means and control mounting means for orienting said apparatus in a plurality of operational configurations; said apparatus including an overhanging hood portion and funnel support means for supporting a funnel under the hood portion for retaining a brewing substance therein, a discharge portion in said hood portion proximate to said funnel for delivering heated water to said funnel; said funnel support means comprising an independently removable base member, two channel members attached to said base member, a laterally extending gap along one edge of each of said channel members, and anchoring means for attaching said funnel support means underneath said hood portion, said anchoring means including a lip member, said lip member being attached to said base member, said lip member projecting upwardly away from said base and abutting an outside surface of said hood portion for prohibiting rotation of said funnel support means positioned under said hood member when said funnel is repeatedly engaged with and disengaged from said funnel support means, said laterally extending gap of each of said channel members being positioned opposing each other and spaced apart a distance for receiving and retaining a funnel therebetween; said control mounting means including a panel portion removably overlying a surface of said apparatus, said panel portion having multiple openings therethrough, a groove extending along a bottom edge of said panel portion for receiving said lip member thereunder, said apparatus having individual slots extending through a side wall of the apparatus for receiving and retaining removable control devices, said openings in said panel portion cooperatively aligning with and overlying said removable control devices retained in said slots, said removable control devices being accessible through said openings, and device retaining means attached to a surface of said panel portion abutting said control devices proximate to said openings for removably retaining said control devices in a desired position between said panel portion and a side wall of said apparatus when said panel portion is attached to said apparatus.

14. A reconfigurable beverage brewing apparatus having reconfigurable control means for permitting orientation of said apparatus in more than one operational configuration; a body of said apparatus having multiple faces, each of said faces generally corresponding to a configuration in which said apparatus is operable, multiple individual device slots formed through each of said faces; said control means comprising removable control devices removably retained on said body in a corresponding one of said individual device slots, and device retaining means for removably retaining said control devices in a desired position in said slots behind said panel portion, said device retaining means comprising a panel portion removably attached to one of said faces of said apparatus, said panel having openings therethrough proximate to said individual device slots, flange portions around a perimeter of said control devices, said individual device slots being formed through said hood portion for retaining said control devices therein, recesses projecting into a rearside of said panel portion for cooperatively receiving said flange portions therein; an inside dimension of said device slots being substantially on the order of an inside dimension of said flange portions and an outside dimension of said flange portions being at least slightly greater than said inside dimension of a corresponding one of said device slots, said device retaining means further including inwardly projecting protrusions attached to said rearside of said panel along a top edge of each of said openings for retaining said control devices in a desired position when positioned in said individual device slots, each of said protrusions abuttably engaging a corresponding one of said devices positioned in a respective one of said individual device slots for prohibiting vertical movement of said control device being retained in said individual device slot.

* * * * *